(12) United States Patent
Lee et al.

(10) Patent No.: US 8,046,913 B2
(45) Date of Patent: Nov. 1, 2011

(54) MANUFACTURING METHOD OF CIRCLE TYPE TERMINAL USED IN DRIVING MOTOR OF HYBRID VEHICLE

(75) Inventors: Do Myoung Lee, Siheung-si (KR); Tea Hyun Kim, Ansan-si (KR); Man Heung Han, Hwasung-si (KR); Gun Soon Kang, Suwon-si (KR)

(73) Assignee: Daesung Electric Co., Ltd., Ansan-si (KR)

( * ) Notice: Subject to any disclaimer, the term of this patent is extended or adjusted under 35 U.S.C. 154(b) by 0 days.

(21) Appl. No.: 12/759,512

(22) Filed: Apr. 13, 2010

(65) Prior Publication Data
US 2011/0119900 A1    May 26, 2011

(30) Foreign Application Priority Data
Nov. 24, 2009   (KR) ........................ 10-2009-0113686

(51) Int. Cl.
*H01K 3/22* (2006.01)
(52) U.S. Cl. ......... 29/848; 29/876; 264/326; 264/328.1; 264/328.3
(58) Field of Classification Search ............ 29/884, 29/848, 856, 876, 883; 439/125, 212, 276, 439/278, 13, 15, 18, 157, 164, 201, 21, 213, 439/218, 24, 26; 903/904; 180/65.1, 65.21, 65.22; 264/326, 328.1, 328.3
See application file for complete search history.

(56) References Cited

U.S. PATENT DOCUMENTS

| | | | | |
|---|---|---|---|---|
| 4,421,371 | A | * | 12/1983 | Clark et al. .................. 439/249 |
| 5,492,842 | A | * | 2/1996 | Eytcheson et al. ............. 438/15 |
| 5,793,140 | A | * | 8/1998 | Tuckey ........................ 310/237 |
| 5,879,809 | A | * | 3/1999 | Muramatsu et al. .......... 428/412 |
| 7,193,345 | B2 | * | 3/2007 | Shinzaki et al. ................ 310/71 |
| 2003/0094879 | A1 | * | 5/2003 | Kobayashi et al. ........... 310/238 |
| 2004/0070293 | A1 | * | 4/2004 | Kabasawa et al. .............. 310/71 |
| 2006/0035090 | A1 | * | 2/2006 | Damo ........................ 428/423.1 |

* cited by examiner

*Primary Examiner* — A. Dexter Tugbang
*Assistant Examiner* — Jeffrey T Carley
(74) *Attorney, Agent, or Firm* — Schmeiser, Olsen & Watts LLP

(57) ABSTRACT

The present invention relates to a manufacturing method of circle type terminal for driving motor of hybrid vehicle, comprising: assembling a terminal assembly having a plurality of bus-rings; accommodating the terminal assembly into an insert jig; coupling the insert jig with an injection mold; and supplying insert resin into the insert jig through the injection mold to integrally form an insulator with the terminal assembly thus performing manufacturing a circle type terminal, thereby providing a simple process to manufacture the circle type terminal and a method of forming an insulating material that can lower a manufacturing cost.

7 Claims, 5 Drawing Sheets

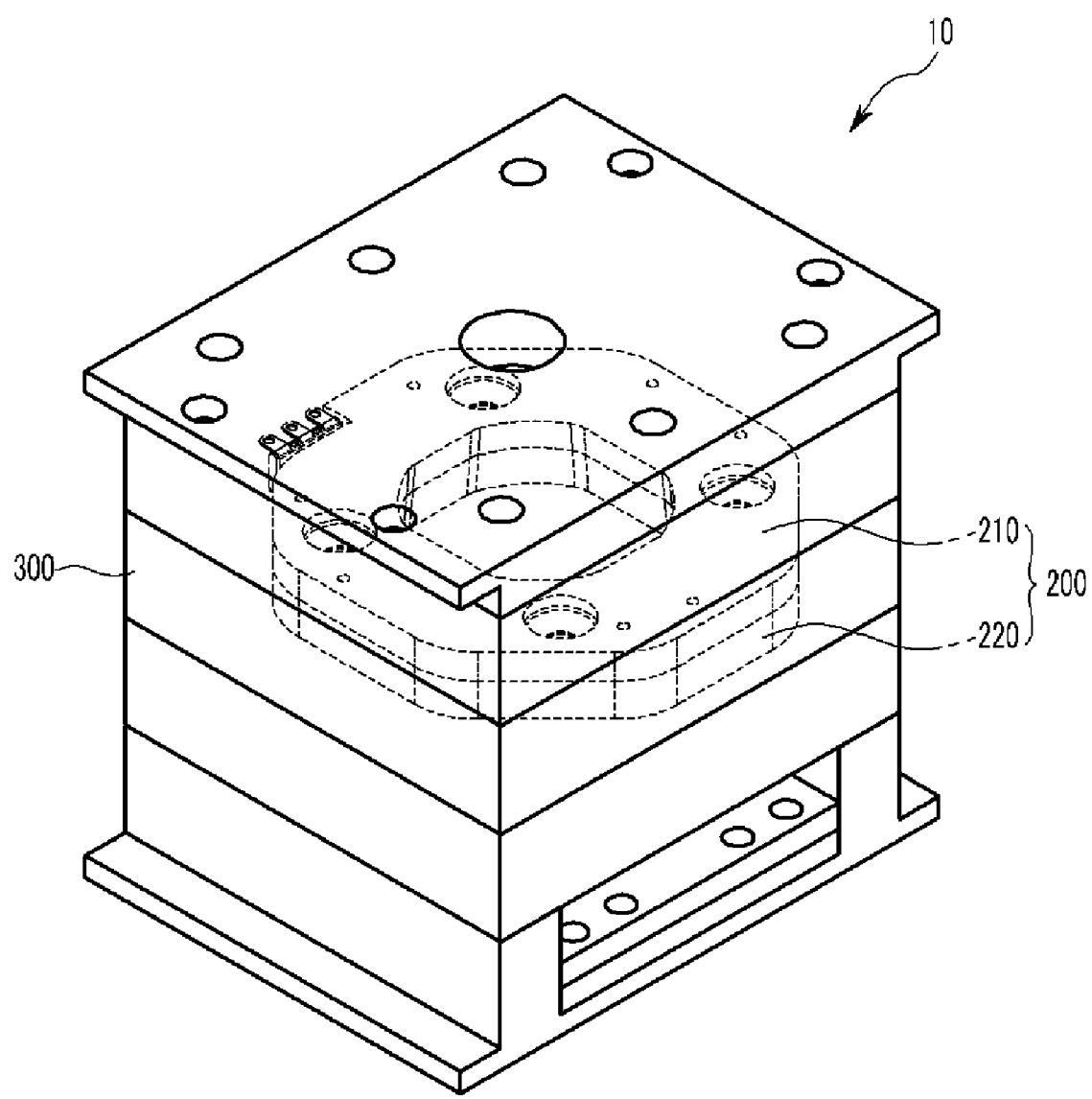
[Figure 1]

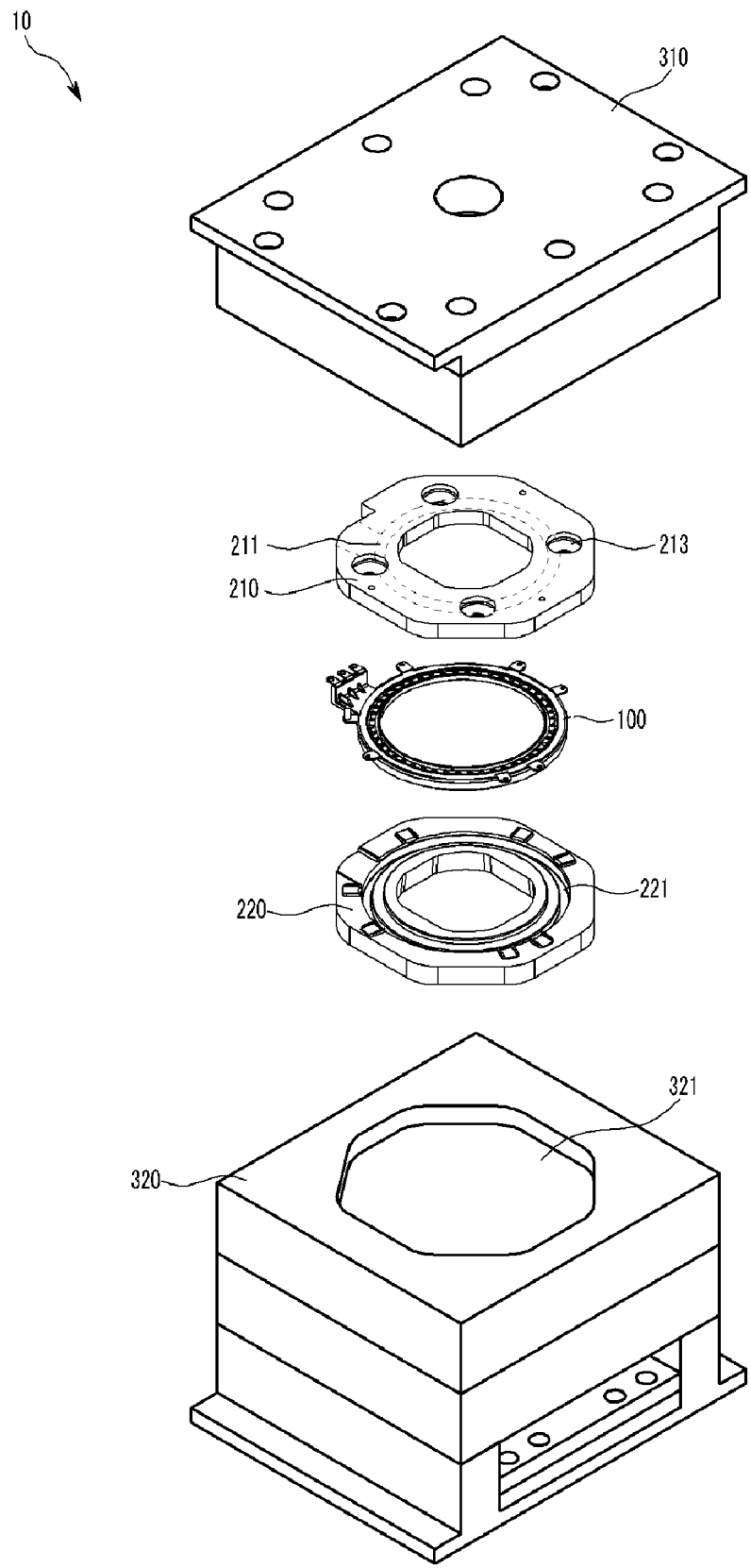
[Figure 2]

【Figure 3】
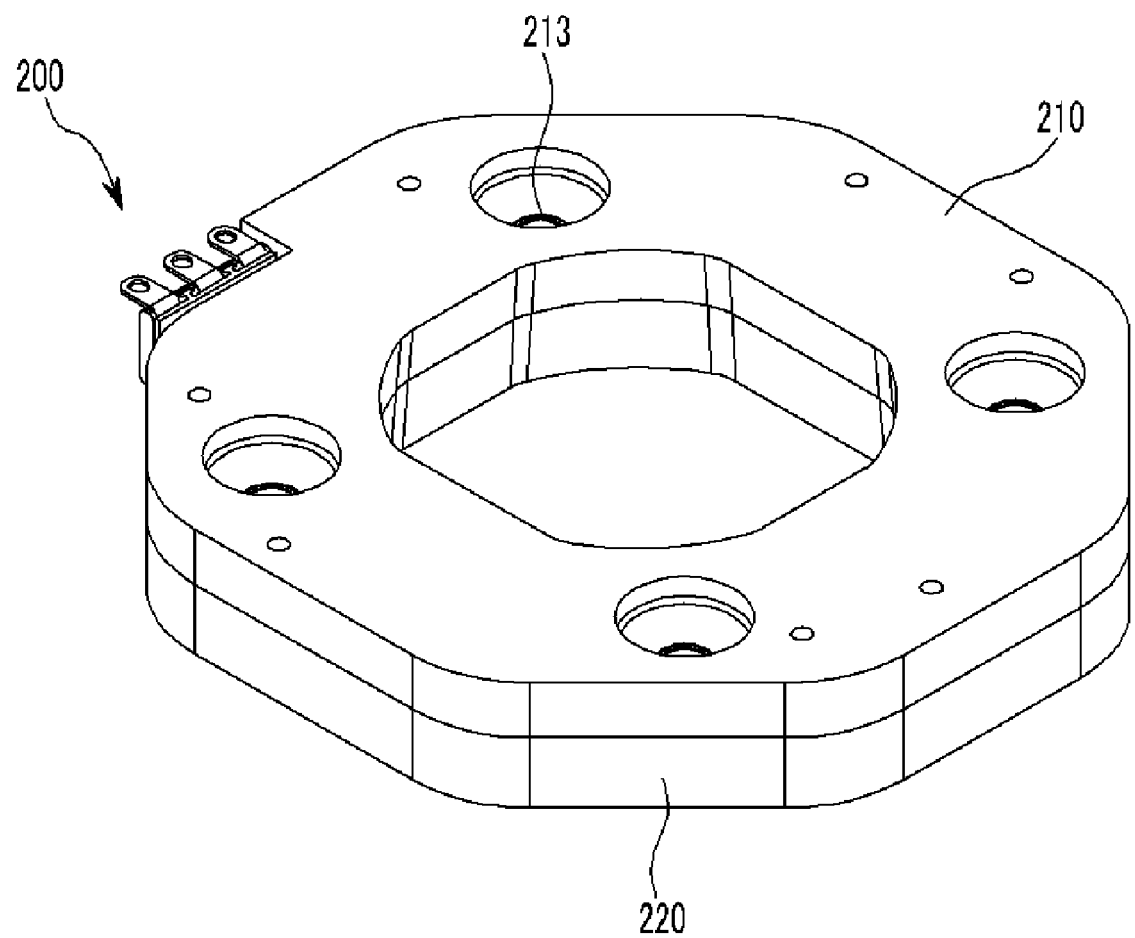

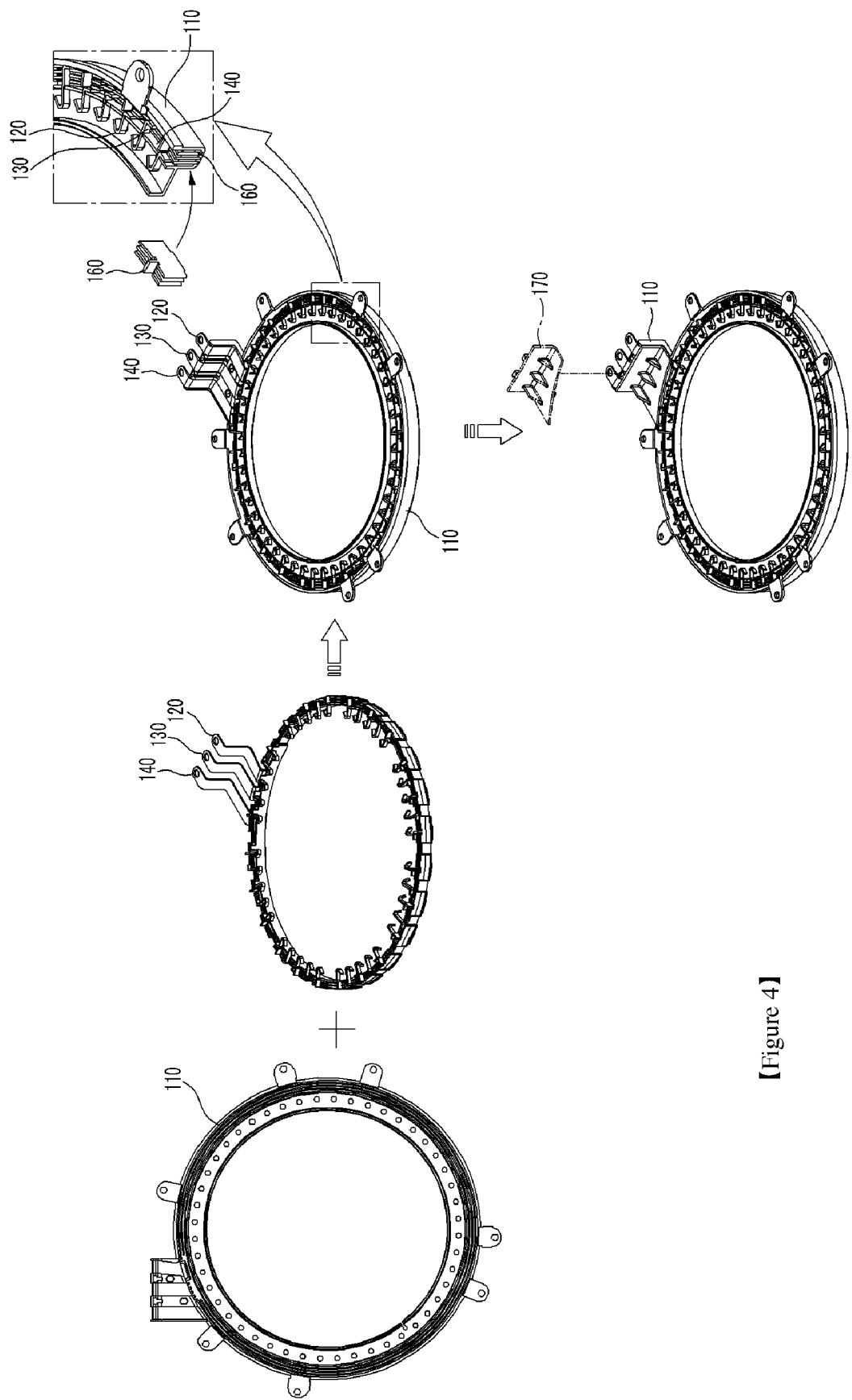
[Figure 4]

[Figure 5]
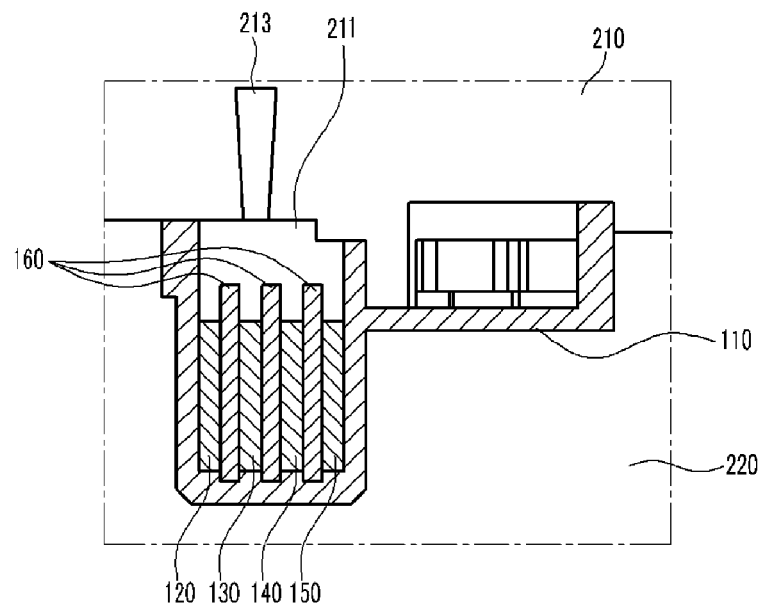
[Figure 6]
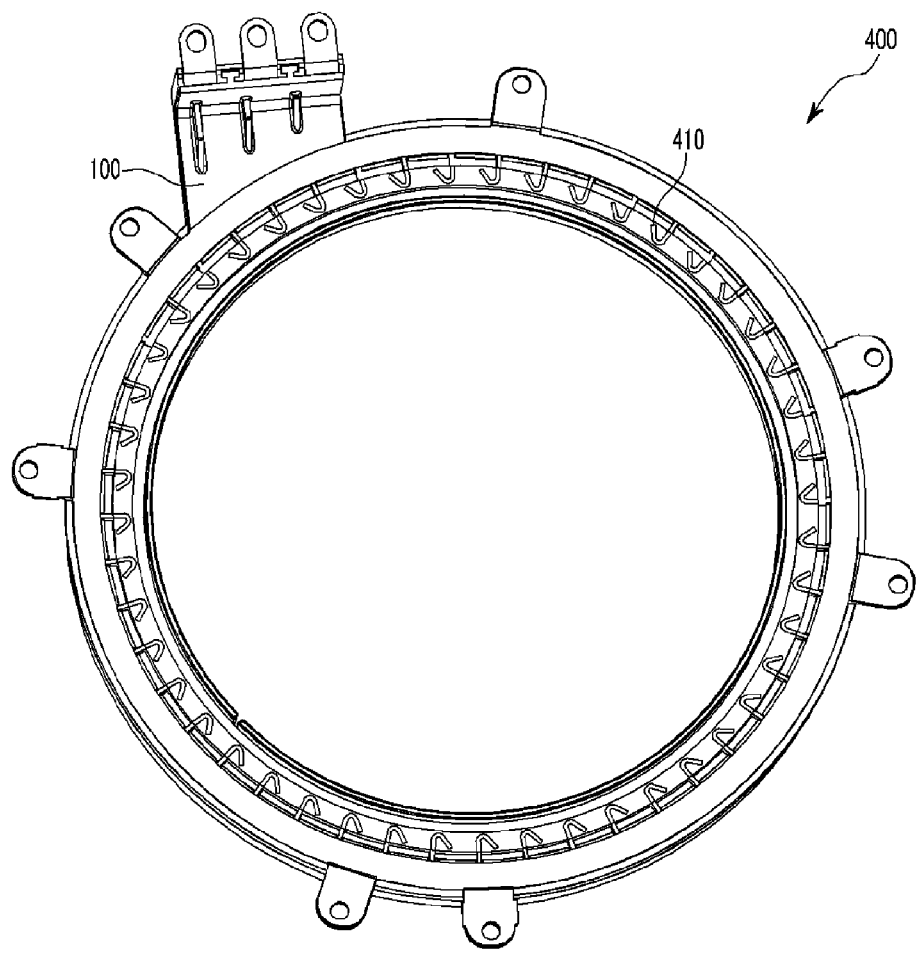

MANUFACTURING METHOD OF CIRCLE TYPE TERMINAL USED IN DRIVING MOTOR OF HYBRID VEHICLE

TECHNICAL FIELD

The present invention relates to a manufacturing method of a circle type terminal, and more particularly, to a manufacturing method of a circle type terminal which is used in a driving motor of a hybrid vehicle.

BACKGROUND ART

A DC brushless motor used as a driving motor in a hybrid vehicle comprises a circle type terminal which has a plurality of copper-made conductors (hereinafter "bus-ring").

The circle type terminal uses a three-phase current to supply to eighteen stator coils for driving a motor.

In this case, an insulating material is used for insulating between phases and also between the terminal and other outside parts.

Conventionally, a coating type insulating material was used for the bus-rings of the circle type terminal.

That is, to manufacture a conventional circle type terminal, a terminal assembly comprising a plurality of bus-rings is assembled, and then the coating type insulating material such as silicon is coated on top of the bus-rings for insulating between the bus-rings.

However, according to the conventional method where the silicon is applied to form the insulating material of the circle type terminal, a manufacturing cost rises due to a high price of the silicon and due to a generation of much loss during coating of the silicon.

Also, the insulating material formed by coating the silicon shows a low level of oil resistance and a low level of insulating resistance due to a generation of air bubbles, thus causing problems in securing credibility on operation.

DISCLOSURE

Technical Problem

The present invention is proposed to solve the above problems for a circle type terminal and it is an aspect of the present invention to provide a manufacturing method of the circle type terminal where only a simple process is used to manufacture the circle type terminal.

Also, it is another aspect of the present invention to provide a manufacturing method of the circle type terminal where a plastic injection resin is used to form an insulating material to lower a manufacturing cost compared to using silicon.

Also, it is another aspect of the present invention to provide a circle type terminal which secures a product credibility by being equipped with a sufficient oil resistance and heat resistance in a condition of driving a hybrid vehicle where it is adopted.

Technical Solution

The foregoing and/or other aspects of the present invention can be achieved by providing a manufacturing method of circle type terminal for driving motor of hybrid vehicle, comprising: assembling a terminal assembly having a plurality of bus-rings; accommodating the terminal assembly into an insert jig; coupling the insert jig with an injection mold; and supplying insert resin into the insert jig through the injection mold to integrally form an insulator with the terminal assembly thus performing manufacturing a circle type terminal.

According to an aspect of the present invention, the insert jig comprises an upper insert jig and a lower insert jig which are coupled together, the upper insert jig is formed with an injection resin flow groove to correspond to the insulator, the lower insert jig is formed with an accommodating groove to accommodate the terminal assembly.

According to an aspect of the present invention, the injection mold comprises an upper injection mold and lower injection mold which is covered by the upper injection mold, the lower injection mold has a jig accommodating depression in which the insert jig is accommodated.

According to an aspect of the present invention, the injection mold comprises an upper injection mold and a lower injection mold which are coupled together, the upper injection mold is formed with an upper insert jig accommodating depression in which the upper insert jig is accommodated, the lower injection mold is formed with a lower insert jig accommodating depression in which the lower insert jig is accommodated.

Advantageous Effects

According to the manufacturing method of the circle type terminal of the present invention described above, a plastic injection resin is supplied to form an insulating material of the circle type terminal, so that a manufacturing cost can be lowered and a manufacturing process can be simplified compared to a conventional method where a silicon is used.

Also, as an insert jig can be easily attached to and detached from an insert mold, various sizes and shapes of the circle type terminal can be manufactured by simply substituting the insert jigs which have different inside formations.

Also, though the silicon forming the conventional insulating material shows characteristics that it is considerably weakened in strength when a heat or gasoline is introduced, the plastic injection resin is resistant to the heat, gasoline and etc. to secure a credibility in a condition of driving a driving motor where the circle type terminal is used.

DESCRIPTION OF DRAWINGS

FIG. 1 is a perspective view of a manufacturing device of a circle type terminal where an exemplary embodiment of the present invention is applied.

FIG. 2 is an exploded perspective view of the manufacturing device shown in FIG. 1.

FIG. 3 shows an assembled state of an insert jig of the manufacturing device shown in FIG. 2.

FIG. 4 is a schematic view to show a manufacturing process of a terminal assembly when using the manufacturing device shown in FIG. 1.

FIG. 5 is an expanded sectional view of a principal part of the insert jig shown in FIG. 3.

FIG. 6 shows a circle type terminal which can be manufactured by using the exemplary embodiment of the present invention.

BEST MODE

Hereinafter, an exemplary embodiment of the present invention will be described by referring to the accompanying figures.

As shown in FIG. 1 and FIG. 2, a circle type terminal manufacturing device 10, which an exemplary embodiment of the present invention is applied to, comprises an insert jig 200 where a terminal assembly 100 is accommodated and an injection resin to be an insulator 410 (see FIG. 6) is introduced thus forming a circle type terminal 400 (see FIG. 6), and an injection mold 300 which receives and supports the insert jig 200 to be detachable.

As shown in FIG. 4, the terminal assembly 100 comprises a plurality of bus-rings 120, 130, 140 and 150 (see FIG. 5) that are assembled to have a shape of a circle respectively to confirm with a driving motor.

As shown in FIG. 5, the terminal assembly 100 according to the exemplary embodiment of the present invention is provided to have four bus-rings 120, 130, 140 and 150 to be assembled with each other.

The bus-rings 120, 130, 140 and 150 are made of a copper alloy.

To assemble the terminal assembly 100, as shown in FIG. 4, four bus-rings 120, 130, 140 and 150 (see FIG. 5) are coupled to a terminal main body 110 and then a plurality of spacers 160 are inserted into the terminal main body 110 to be spaced with each other in a circular direction thus maintaining an insulation gap between the bus-rings 120, 130, 140 and 150 as shown in FIG. 5.

Each of the bus-rings 120, 130, 140 and 150 has a different diameter to be disposed concentrically.

The spacer 160 has its shape to be inserted between the bus-rings 120, 130, 140 and 150 and is disposed at a predetermined interval along the bus-rings 120, 130, 140 and 150.

When the spacers 160 are inserted, a cover 170 is attached to a side of the terminal main body 110 as shown in FIG. 4 thus completing assembling of the terminal assembly 110.

Then, as shown in FIG. 2, the terminal assembly 110 is inserted into the insert jig 200.

As shown in FIG. 2 and FIG. 3, the insert jig 200 accommodates the terminal assembly 100 therein and then the injection resin is introduced to form the insulator 410 (see FIG. 6) on top of the terminal assembly 100.

The insert jig 200 has an injection resin flow hole 211 to correspond to a shape of the insulator 410.

The insert jig 200 comprises an upper insert jig 210 and a lower insert jig 220.

The lower insert jig 220 has an inner accommodating groove 221 to correspond to the shape of the terminal main body 110 (see FIG. 4) of the terminal assembly 100 to accommodate the terminal assembly 100.

In this case, the injection resin can not be introduced into the lower insert jig 220 as the terminal assembly 100 is tightly accommodated in the inner accommodating groove 221 (refer to FIG. 5).

As shown in FIG. 5, the upper insert jig 210 has an injection resin flow groove 211 to correspond to the shape of the insulator 410 of the circle type terminal 400.

The injection resin which is introduced through the injection resin flow groove 211 is supplied evenly on top of the terminal assembly 100 to be the insulator 410 that is integrally formed with the terminal assembly 100.

Therefore, the insulator 410 formed on top of the terminal assembly 100 performs insulating a plurality of the bus-rings 120, 130, 140, 150 therebetween.

The injection resin flow groove 211 communicates with the injection resin supplying hole 213.

The injection resin supplying hole 213 passes through the upper insert jig 210 to be supplied with the injection resin through the injection mold 300 (see FIG. 1).

As shown in FIG. 2 and FIG. 3, the insert jig 200 is made to order to form the insulator 410 that corresponds to the shape of the each terminal assembly 100.

The insert jig 200 is provided to be attached to and detached from the injection mold 300.

That is, when the insert jig 200 accommodates the terminal assembly 100, it is coupled to the injection mold 300 to be supplied with the injection resin.

And when the injection molding is finished, the insert jig 200 is separated from the injection mold 300 thus enabling separation of the circle type terminal 400 which is made by integrally forming the terminal assembly 100 and the insulator 410.

As shown in FIG. 1 and FIG. 2, the injection mold 300 comprises an upper injection mold 310 and a lower injection mold 320 and accommodates the insert jig 200 therein.

The injection mold 300 supports the insert jig 200 so that the injection resin can be supplied into the insert jig 200 to form the terminal assembly 100 and the injection resin integrally.

The upper injection mold 310 covers and uncovers the lower injection mold 320.

The lower injection mold 320 accommodates and supports the insert jig 200.

The lower injection mold 320 has a jig accommodating depression 321 to accommodate the insert jig 200.

The insert jig 200 is made of a material that is light and durable such as duralumin.

The insert jig 200 has a uniform shape outwardly, but may have various shapes inwardly according to various shapes of the terminal assembly 100.

Therefore, with only one injection mold 300, various insert jigs 200 having different inner shapes therebetween can be coupled for manufacturing various kinds of circle type terminals.

The insert jig 200 can be coupled to the injection mold 300 by means of bolts and nuts that are provided to the insert jig 200, by insertion of ribs and holes, by interference fit between the insert jig 200 and the injection mold 300 or by any other way.

The injection mold 300, unlike in this exemplary embodiment of the present invention, may have the upper injection mold 310 which accommodates the upper insert jig 210 and the lower injection mold 320 which accommodates the lower insert jig 220.

Hereinafter, a manufacturing method of the circle type terminal 400 by using the circle type terminal manufacturing device 10 described above.

First, the terminal assembly 100 is assembled.

That is, as shown in FIG. 4, a plurality of the bus-rings 120, 130, 140 and 150 (see FIG. 5) are assembled together into the terminal main body 110.

Then, the spacers 160 are inserted to be interposed between a plurality of the bus-rings 120, 130, 140 and 150.

In a state that the insulation gap is maintained between a plurality of the bus-rings 120, 130, 140 and 150 by the spacers 160, the cover 170 is attached to the terminal main body 110.

If the assembling of the terminal assembly 100 is finished by attachment of the cover 170, the terminal assembly 100 is accommodated into the insert jig 200 (refer to FIG. 2).

That is, the terminal assembly 100 is accommodated in the inner accommodating groove 221 of the lower insert jig 220 and the upper insert jig 210 is coupled to the lower insert jig 220 as shown in FIG. 3.

Then, the insert jig 200 is accommodated in the injection mold 300 (refer to FIG. 1 and FIG. 2).

Alternatively, according to another exemplary embodiment, the upper insert jig 210 may be accommodated into an accommodating depression (not shown) of the upper injection mold 310 and the lower insert jig 220 may be accommodated into an accommodating depression (refer to 321) of the lower injection mold 320.

As shown in FIG. 1, when fixing of the insert jig 200 and the injection mold 300 is finished, the injection resin is introduced.

The injection resin is introduced into the insert jig 200 through the injection mold 300.

That is, as shown in FIG. 5, the injection resin that is supplied through the injection resin supplying hole 213 of the upper insert jig 210 is supplied to the upper surface of the terminal assembly 100 that is accommodated in the insert jig 210 and 220.

Accordingly, the injection resin is integrally formed with the terminal assembly 100 to form the insulator 410 (see FIG. 6).

When an insert injection molding is finished as described above, the insert jig 200 is separated from the injection mold 300.

The upper insert jig 210 and the lower insert jig 220 are separated from each other to extract the circle type terminal 400 (see FIG. 6) that is formed by integrally forming the terminal assembly 100 and the insulator 410 (refer to FIG. 2).

The circle type terminal 400 formed by performing the injection molding is manufactured in a condition that the injection resin is uniformly supplied over all of the upper surface of the terminal assembly 100 by injection pressure, so that a thickness of the insulator 410 can be maintained constant.

Although the exemplary embodiment of the present invention has been shown, it will be appreciated by those skilled in the art that changes may be made in the exemplary embodiment without departing from the principles and spirit of the invention, the scope of which is defined in the appended claims and their equivalents.

The invention claimed is:

1. A manufacturing method of circle type terminal for driving motor of hybrid vehicle comprising:
assembling a terminal assembly having a plurality of bus-rings;
accommodating the terminal assembly into an insert jig comprising an upper insert jig and a lower insert jig which are coupled together, where the upper insert jig is formed with an injection resin flow groove to correspond to an insulator and the lower insert jig is formed with an accommodating groove to accommodate the terminal assembly;
coupling the insert jig with an injection mold; and
supplying insert resin into the insert jig through the injection mold to integrally form the insulator with the terminal assembly thus performing manufacturing a circle type terminal.

2. The manufacturing method of circle type terminal for driving motor of hybrid vehicle according to claim 1 wherein the injection mold comprises an upper injection mold and lower injection mold which is covered by the upper injection mold, the lower injection mold has a jig accommodating depression in which the insert jig is accommodated.

3. The manufacturing method of circle type terminal for driving motor of hybrid vehicle according to claim 1 wherein the injection mold comprises an upper injection mold and a lower injection mold which are coupled together, the upper injection mold is formed with an upper insert jig accommodating depression in which the upper insert jig is accommodated, the lower injection mold is formed with a lower insert jig accommodating depression in which the lower insert jig is accommodated.

4. The manufacturing method of circle type terminal for driving motor of hybrid vehicle according to claim 1 wherein the insert jig is structured to repeatedly and releasably couple with the injection mold.

5. The manufacturing method of circle type terminal for driving motor of hybrid vehicle according to claim 1 wherein the insert jig is structured to repeatedly and releasably detach from the injection mold.

6. The manufacturing method of circle type terminal for driving motor of hybrid vehicle according to claim 1 wherein the injection mold completely surrounds the insert jig under the condition that the insert jig and the injection mold are coupled together.

7. The manufacturing method of circle type terminal for driving motor of hybrid vehicle according to claim 1 wherein, under the condition that the insert jig and the injection mold are coupled together, the injection mold completely surrounds the insert jig and the insert jig completely surrounds the terminal assembly.

* * * * *